UNITED STATES PATENT OFFICE.

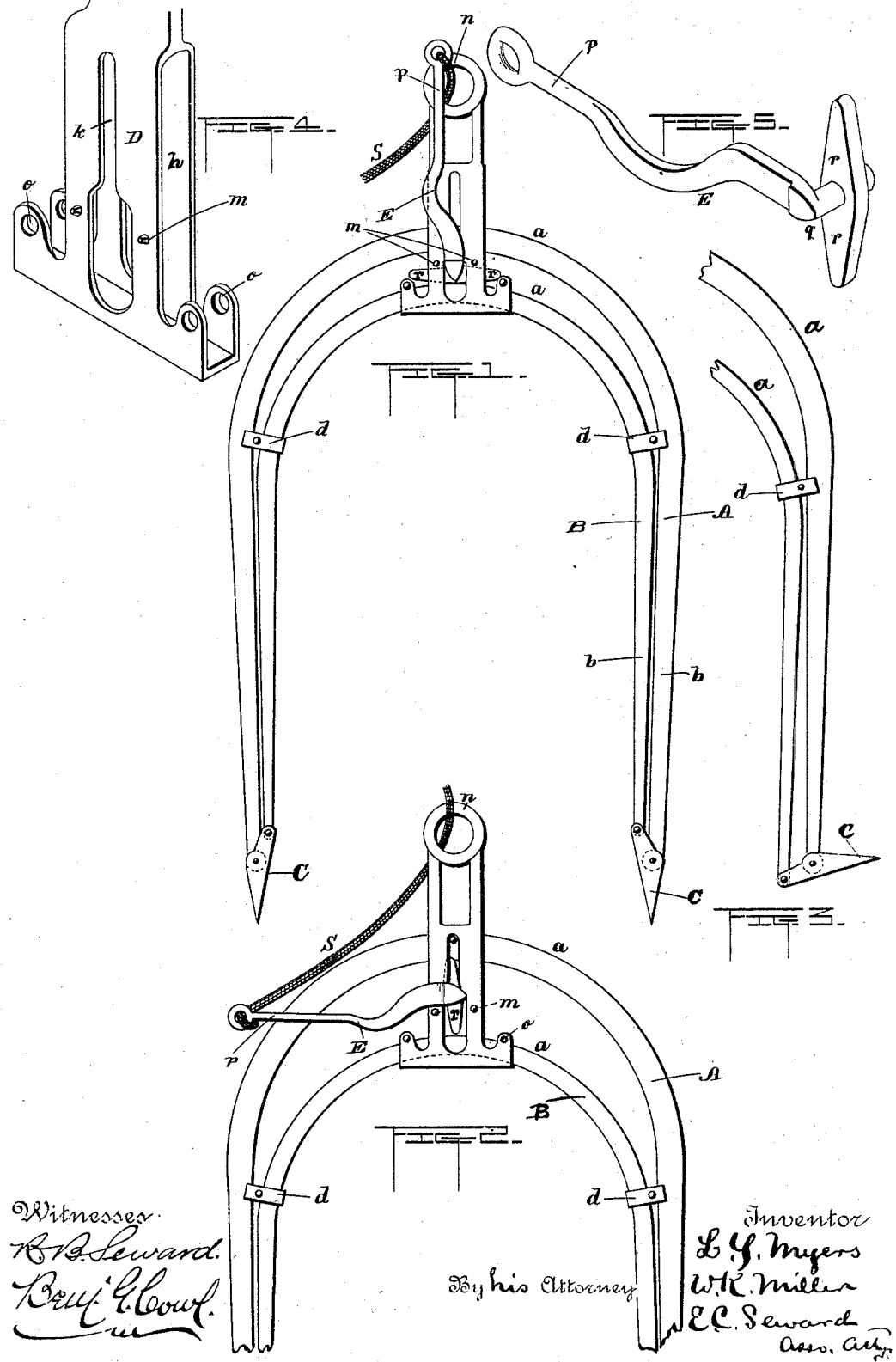

LEWIS Y. MYERS, OF CANTON, OHIO.

HAY-FORK.

SPECIFICATION forming part of Letters Patent No. 415,729, dated November 26, 1889.

Application filed February 2, 1889. Serial No. 298,543. (No model.)

*To all whom it may concern:*

Be it known that I, LEWIS Y. MYERS, a citizen of the United States, and a resident of Canton, county of Stark, State of Ohio, have invented a new and useful Improvement in Hay-Forks, of which the following is a full, clear, and exact description, reference being had to the accompanying drawings, making part of this specification.

My invention relates to improvements in hay-forks, and more especially to that class known as "double-harpoon forks;" and it consists of the construction and combination of parts, as hereinafter described, and set forth in the claims.

Figure 1 is an elevation of a hay-fork illustrating my invention, showing the fork in position to enter the hay. Fig. 2 is a similar view of the upper portion of the fork, showing the parts in position for elevating. Fig. 3 is a similar view of a fragment of the fork, showing the position of the tines when set for elevating. Fig. 4 is a view in perspective of the head portion of the fork, and Fig. 5 a similar view of the operating lever and lock.

Similar letters of reference indicate corresponding parts in all the figures of the accompanying drawings.

The frame portion consists of the two inverted-U-shaped frames A and E, formed substantially as shown in the drawings, the frame A being wider than frame B, so that the latter may embrace the former, as shown in Fig. 1 of the drawings. The upper portions of the frames A B may be of any desired form of curvature; but for the purposes of the case I have given them a circular form, as shown at $a$. The prongs $b$ are parallel, the lower ends being pivotally secured to a tine, as C, the outer prong to the middle, and the inner prong to the heel portions of the tine, as shown in Figs. 1 and 3, and to further secure the alignment of the prongs clips, as $d$, are provided. In this case a U-shaped clip is secured about the frame-piece B, the free end to embrace the sides of the frame-piece A.

A head portion D is provided, and may be made of any suitable material, preferably of cast malleable iron, the form of which is substantially that shown in Fig. 4 of the drawings, having a loop portion $h$, transverse slot, as $k$, and projections, as $m$, and ring $n$. The frame-pieces A B are passed through the loop $h$, and the piece B secured to the apex or upper portion of the circular portion $a$ and secured in the bottom portion of the head, as shown in Figs. 1 and 2, by rivets through the ears $o$. This method of securing the head to the frame obviates the cost of perforating the frame and secures the full strength of the metal. The frame-piece A is free to be vibrated up and down in the loop $h$.

To operate the parts hereinbefore described, a lever, as E, is provided, having a handle portion, as $p$, journal portion $q$, and a T-shaped cam portion $r$, and the said cam portion is passed through the large or bottom portion of the slot $k$. After having been placed within the loop $h$ the cam $r$ may be vibrated by the handle-lever E from the vertical position shown in Fig. 1 to a horizontal position, as shown in Fig. 2, and when so vibrated will throw the frames A B apart at their upper or bight portions, forcing the prongs of the frame B down or out, by which movement the tine C will be swung from the position shown in Fig. 1 to that shown in Fig. 3. To trip the cam $r$ to release the load, a cord, as S, is secured to the lever E and passed through the ring $n$ to the operator. To use the fork, the parts should be in the position shown in Fig. 1, in which position the prongs are passed into the hay. The lever E is then thrown over onto the projection $m$, which for an instant acts as a fulcrum by which the cam $r$ is raised to a vertical position, as shown in Fig. 2, and the tines C thrown into position to hold the hay, as shown in Fig. 3, and when the load has reached the desired point a slight pull on the cord S will trip the cam $r$, allowing the weight of the hay on the tines to draw them down, as shown in Fig. 1, resetting the fork for another operation.

Having thus fully described my invention, what I claim, and desire to secure by Letters Patent, is—

1. The fork consisting, essentially, of two U-shaped frames, one having wider spread branches than the other and fitted to embrace the outer edge of the latter, tines pivoted centrally to the ends of the outside frame and having their heads pivoted to the ends of the inside frame, a supporting-head secured to one of the frames, and an operating lever seated in the supporting-head, substantially as set forth.

2. The combination, with U-shaped frames seated the one about the outer edge of the other, of tines pivoted to the ends of the frames, a supporting-head secured to the inside frame, an operating-lever seated in the supporting-head, and a cam on the lever located between the bights of the frames and engaging the adjacent edges of the said bights of the frames, substantially as set forth.

3. The combination, with the U-frames A B, placed one within the other, of the head D, adapted to be secured to the frame B, and having the loop $h$ and vertical transverse slot $k$, substantially as described, and for the purpose set forth.

4. The combination, with the U-frames A B, placed one within the other and adapted for vertical movement, of the tines C, pivotally secured to said frames, the head D, having a vertical loop $h$, vertical transverse slot, as $k$, and the lever E, having journal portion $q$ and cam $r$, substantially as described, and for the purpose set forth.

5. The combination, with the U-shaped frames A B, placed one within the other, of the tines C, pivotally secured thereto, the head D, having a vertical loop, as $h$, transverse slot, as $k$, projections $m$, and the lever E, having transverse portions, as $r$, substantially as described, and for the purpose set forth.

6. The fork consisting of two U-shaped frames, tines pivoted to the lower ends of the frames, a supporting-head fixed to one frame, and an operating-lever inserted between the bights of the frames, the journal of the lever having a free vertical movement relatively to the supporting-head, substantially as set forth.

In testimony whereof I have hereunto set my hand this 21st day of January, A. D. 1889.

LEWIS Y. MYERS.

Witnesses:
W. K. MILLER,
CHAS. R. MILLER.